United States Patent [19]

Yuasa et al.

[11] Patent Number: 5,739,230
[45] Date of Patent: Apr. 14, 1998

[54] CURABLE RESIN COMPOSITION FOR COATING USE

[75] Inventors: Kouichi Yuasa, Otokuni-gun; Koichi Fukuden, Kadoma; Haruhiko Sawada, Osaka; Kei Aoki, Ikoma, all of Japan

[73] Assignee: Nippon Paint Co., Ltd., Osaka, Japan

[21] Appl. No.: 630,631

[22] Filed: Apr. 11, 1996

[30] Foreign Application Priority Data

Apr. 12, 1995 [JP] Japan ................. 7-111151

[51] Int. Cl.$^6$ .................. C08F 26/06; C08F 122/04; C08F 122/10
[52] U.S. Cl. .................. 526/217; 526/193; 526/225; 524/413; 524/425; 524/431; 524/437; 525/301; 525/303
[58] Field of Search .................. 526/217, 225, 526/193; 524/413, 425, 431, 437; 525/301, 303

[56] References Cited

U.S. PATENT DOCUMENTS

| 5,017,649 | 5/1991 | Clemens et al. | 525/59 |
| 5,021,511 | 6/1991 | Larson et al. | 525/298 |
| 5,084,536 | 1/1992 | Brindopke et al. | 526/218.1 |
| 5,219,958 | 6/1993 | Noomen et al. | 525/10 |

*Primary Examiner*—Irina S. Zemel
*Attorney, Agent, or Firm*—Millen, White, Zelano, & Branigan, P.C.

[57] ABSTRACT

A curable resin composition curable through a Michael reaction between (a) a component having a plurality of α,β-unsaturated carbonyl groups and (b) a component having a plurality of activated methylene or activated methyne groups is disclosed. The curing reaction is catalyzed with a quaternary ammonium, quaternary phosphonium or tertiary sulfonium salt in the presence of finely divided, water-insoluble, inorganic particles having a surface basicity of greater than 1.0 μmol/g which also do not have catalytic activity on the Michael reaction.

10 Claims, No Drawings

CURABLE RESIN COMPOSITION FOR COATING USE

FIELD OF THE INVENTION

This invention relates to a curable resin composition for coating use. More paticularly, it relates to a resinous composition which cures through a Michael reaction.

BACKGROUND OF THE INVENTION

Michael reactions in which activated methylene is added to a polarized unsaturation such as $\alpha$, $\beta$-unsaturated carbonyl are utilized in the crosslinking of resinous compositions for coating use. Theses compositions are advantageous in that the Michael reaction gives a chemically stable crosslinking bond without forming any reaction by-product.

Typical examples of prior art include the following patent literatures:

U.S. Pat. No. 4,408,018;
U.S. Pat. No. 5,017,649;
U.S. Pat. No. 5,084,536;
EP-A-0448154
JP-A-01/121341 (EP-A-0310011);
JP-A-01/204919 (EP-A-0326723);

Michael reactions in general require a base catalyst for forming carboanions from active hydrogen sites such as activated methylene or methyne group. Most of prior art compositions utilizing the Michael reaction for crosslinking employ a strong base such as alkali metal hydroxides, alkali metal alkoxides, quaternary ammonium hydroxides or carbonates, tertiary amines, quanidines, amidines and tertiary phosphines.

Because such strong base catalysts may catalize the Michael reaction even at ambient temperature, systems containing the strong base generally have to be formulated into a two component composition. The strong base catalyst may also hydrolyze or otherwise deteriorate resin components when remained in the films applied on substrates. For example, amines may cause yellowing of the cured films. Alkali metal based catalysts are hardly soluble in organic solvents conventially used in coating compositions and, therefore, may result, when used, in cured films of unsatisfactory appearance.

The present invention has its basis on the discovery that quaternary ammonium or like onium salts having no or little catalytic activity may exhibit an adequate activity on a Michael type crosslinking reaction in the presence of finely divided, water-insoluble, inorganic particles having a surface basicity of greater than 1.0 µmol/g which also do not have catalytic activity in the Michael reaction. The present invention may, therefore, achieve a number of advantages over the prior art compositions. The composition of the present invention may be formulated in a one-component or one-pot composition having a relatively long pot life while retaining an adequate curability.

SUMMARY OF THE INVENTION

The present invention provides a curable resin composition for coating use comprising:

(a) a component containing a plurality of $\alpha$, $\beta$-ethylenically unsaturated carbonyl functions in the molecule;

(b) a component containing a plurality of an activated methylene group or an activated methyne group;

(c) a quaternary ammonium salt, a quaternary phosphonium salt or a tertiary sulfonium salt which does not have catalytic activity at ambient temperature when used alone;

(d) finely divided, water-insoluble, inorganic particles having a surface basicity of greater than 1.0 µmol/g which also do not have catalytic activity on the Michael reaction The resin composition of the present invention may exhibit an adequate curability at ambient or elevated temperatures and has a relatively long pot life even formulated into a one-component composition. Unlike amine catalysts, the onium salt will not cause yellowing or other deterioration in the resulting cured films. Furthermore, the solubility of the onium salt in the solvents commonly used in coating compositions may be increased by suitably selecting hydrocarbon residues attached to the onium atom so as to ensure uniform dissolution in the composition.

DESCRIPTION OF THE PREFERRED EMBODIMENTS

Component (a)

Component (a) is a compound or polymer having a plurality of ethylenic unsaturations between carbon atoms at the $\alpha$ and $\beta$ positions relative to a carbonyl group. Typical examples of such compound are acrylic or methacrylic (hereinafter collectively referred to as "(meth) acrylic") esters of polyhydric alcohols such as ethylene glycol di(meth)acrylate, diethylene glycol di(meth)-acrylate, propylene glycol di(meth)acrylate, neopentyl glycol di(meth) acrylate, trimethylolpropane tri(meth)-acrylate, glycerol tri (meth)acrylate, pentaerythritol tetra(meth)acrylate and the like. Acrylates or methacrylates of polyester polyols known as polyester acrylate resins fall within this class.

Unsaturated polyesters containing an unsaturated dicarboxylic acid such as maleic or fumaric acid may also be used as component (a). Unsaturated polyesters are used in large quantities for molding various FRP products and may be synthesized, as is well-known, by the polycondensation reaction between an $\alpha$, $\beta$- unsaturated dicarboxylic acid component such as maleic anhydride or fumaric acid optionally containing other polycarboxylic acids such as phthalic anhydride, isophthalic, terephthalic, adipic, sebacic or trimellitic acid and a polyol component such as ethylene glycol, diethylene glycol, propylene glycol, tetramethylene glycol, 1,6-hexanediol, neopentyl glycol, trimethylolpropane, glycerine or pentaerythritol.

Other examples of component (a) include epoxy acrylate resins produced by reacting (meth)acrylic acid with an epoxy resin such as bisphenol or novolac type epoxy resins, and urethane acrylate resins produced by reacting a hydroxyl group-containing acrylic. resin first with an organic polyisocyanate such as isophoronediisocyanate, tolylenediisocyanate, diphenylmethanediisocyanate, hexamethylenediisocyanate or a urethane prepolymer thereof and then with 2-hydroxyethyl (meth)acrylate.

Acrylic resins containing a plurality of $\alpha$, $\beta$-unsaturated carbonyl functions may be produced via the ring-opening reaction of an epoxy ring with (meth)acrylic acid or the acylation of a hydroxyl group with (meth)acrylic acid. For example, epoxy group-containing acrylic resins may be produced by copolymerizing an epoxy group-containing acrylic monomer such as glycidyl (meth)acrylate with an acrylic monomer free of the epoxy group and/or a nonacrylic ethylenically unsaturated monomer. Examples of copolymerizable acrylic monomers include alkyl (meth)-acrylates such as methyl, ethyl, propyl, n-butyl, isobutyl, t-butyl, 2-ethylhexyl or lauryl (meth)acrylate; hydroxyalkyl (meth) acrylates such as 2-hydroxyethyl (meth)-acrylate; aryl or aralkyl (meth)acrylates such as phenyl or benzyl (meth) acrylate; PLACCEL FA1 or FM1 (an adduct of 2-hydroxyethyl (meth)acrylate with polycaprolactone sold by Daicel Chemical Industries, Ltd.); and other acrylic monomers such as acrylamide, methylene-bis-acrylamide or acrylonitrile. Examples of copolymerizable non-acrylic monomers include styrene, α-methylstyrene, itaconic acid, maleic acid, or vinyl acetate and the like. The epoxide function of the acrylic copolymer may then be opened with (meth)acrylic acid to introduce the α, β-unsaturated carbonyl function. Conversely, an epoxy group-containing acrylic monomer such as glycidyl (meth)acrylate may be reacted with an acrylic polymer containing a plurality of free carboxylic functions which may be produced by copolymerizing a carboxyl group-containing monomer such as acrylic, methacrylic or itaconic acid with a copolymerizable acrylic monomer and optionally with a non-acrylic monomer as discussed supra.

Acryl polyols containing a plurality of hydroxyl groups may be modified to have a plurality of α, β-unsaturated carbonyl functions by the acylation reaction with acrylic or methacrylic acid or a reactive derivative thereof such as chloride, or the transesterification reaction with a lower alkyl (meth)acrylate such as methyl (meth)acrylate. Acryl polyols may be produced by copolymerizing a hydroxyl group-containing acrylic monomer such as 2-hydroxyethyl (meth) acrylate, 2-hydroxypropyl (meth)acrylate, 4-hydroxybutyl (meth)acrylate or PLACCEL FM-1 with a copolymerizable acrylic and/or non-acrylic monomer as discussed supra.

Further examples of component (a) include polyether acrylate resins such as polyethylene glycol di(meth)-acrylate, and silicone oligoners such as 3-methacryloyloxy-propyl-terminated polydiorganosiloxanes.

When component (a) is a resin, its molecular weight ranges between 150 and 100,000, preferably between 200 and 10,000, and the alkenyl equivalent weight ranges between 50 and 10,000, preferably between 70 and 1,000. The term "equivalent weight" as used herein refers to the molecular weight divided by the number of a function concerned.

Component (b)

Compounds or resins usable as component (b) have a plurality of activated methylene or methyne groups in the molecule. Typical examples of activated methylene compounds are acetoacetic acid, cyanoacetic acid, malonic acid and derivatives of these acids. Component (b) having a plurality of activated methylene groups may be prepared from these activated methylene carboxylic acids or derivatives thereof. For examples, polyols may be reacted with a reactive derivative of acetoacetic, cyanoacetic or malonic acid to obtain component (b). Polyols may be a polyhydric alcohol used in the production of unsaturated polyesters as the polyol component thereof, or a polymeric polyol such as acryl polyols, polyester polyols, polyether polyols, epoxy polyols, polyurethane polyols or silicone polyols. Reactive derivatives of acetoacetic, cyanoacetic or malonic acid may be their lower alkyl esters or halides. Polyester resins having a plurality of activated methylene groups may be produced by polycondensating a polycarboxylic acid component containing dialkyl malonates and a polyol component as discussed supra.

Component (b) having a plurality of acetoacetamide groups may be produced by reacting diketene with a polyamine such as ethylenediamine, 1,3-diaminopropane, 1,4-diaminobutane, 1,6-hexanediamine, 1,12-diaminododecane, 1,2-diaminocyclohexane, phenylenediamine, piperazine, 2,6-diaminotoluene, diethyltoluenediamine, N,N'-bis(2-aminopropyl)-ethylenediamine, or N,N'-bis(3-aminopropyl)-1,3-propanediamine.

Acrylic resins having a plurality of activated methylene groups may be produced by copolymerizing an acrylic monomer having an activated methylene group such as 2-acetoacetoxyethyl (meth)acrylate, 2-cyanoacetoxyethyl (meth)acrylate, N-(2-cyanoacetoxyethyl)acrylamide, N-(2-propionylacetoxybutly) acrylamide, N-(4-acetoacetoxymethyl) benzylacrylamide, N-(2-acetoacetylaminoethyl)acrylamide or N-(2-acetoacetylaminoethyl)methacrylamide with an acrylic and/or nonacrylic monomer as discussed supra with regard to component(a).

Component (b) having a plurality of activated methyne groups may be produced, as disclosed in EP-A-0310011, by the transesterification between a trialkyl methanetricarboxylate and a nonpolymeric or polymeric polyol, or by the addition reaction between an activated methylene compound and an isocyanate compound. As will be apparent, either one of the activated methylene and isocyanate reactants should be polyfunctional. For example, a polyisocyanate reactant produced by reacting a diisocyanate with a polyol at an NCO/OH ratio of greater than 1 may be reacted with a monofunctional activated methylene reactant such as dialkyl molonate. Alternatively, those compounds or resins having a plurality of activated methylene groups as discussed supra may be reacted with a monofunctional isocyanate.

Component (b) may have both activated methylene and activated methyne groups in a mixture or in a single resin entity. For example, a copolymer of a monomer mixture containing an activated methylene-containing acrylic monomer and an activated methyne-containing acrylic monomer may be copolyemrized optionally with other comonomers.

When component (b) is a resin, its molecular weight ranges between 1,000 and 100,000, preferably between 1,000 and 10,000, and the active hydrogen equivalent weight ranges between 40 and 10,000, preferably between 80 and 5,000.

Component (c)

A variety of ammonium salts may be used. However, tetraalkyl and trialkylaralkyl type ammonium salts are preferred for economical reasons. Nitrogen-containing heterocyclic ammoniums salts such as those derived from pyridine, piperidine, piperazine or morpholine may also be used. Specific examples of ammonium cations include tetrabutylammonium, tetramethylammonium, tetraethylammonium trimethylbenzylammonium, tetrapropylammonium, tetrahexylammonium, tetraoctylammonium, tetradecylammonium, tetrahexadecylammonium, triethylhexylammonium, 2-hydroxyethyltrimethylammonium (choline), methyltrioctyl-ammonium, cetyltrimethylammonium, 2-chloroethyltrimethyl-ammonium and methylpyridinium.

Counter anions should be capable of forming a non-basic stable salt with the ammonium cations and include halides, carboxylates, sulfonates, nitrate, nitrite, sulfate, sulfite, phosphate and acid phosphate esters. Specific examples thereof include acetate, laurate, glycolate, benzoate, salicylate, maleate, phthalate, chloride, bromide, iodide, methanesulfonate, p-toluenesulfonate, dodecylbenzene sulfonate, triflate, nitrate, sulfate, methosulfate, phosphate and acid t-dibutylphosphate. Quaternary phosphonium salts such as tetrabutylphosphonium bromide and tertiary sulfonium salts such as trimethylsulfonium iodide may also be used.

Onium salts having above counter anions do not exhibit catalytic activity at ambient temperature when used alone but have catalytic activity only in the presence of component (d) at ambient temperature or under the conventional baking condition.

Component (d)

The surface basicity may be represented by the following equation:

Surface Basicity=Mb−Ma wherein Mb is the quantity of surface base represented in terms of µmol/g, and Ma is the quantity of surface acid represented in terms of µmol/g.

Mb and Ma, in turn, may be determined as follows:
1. Mb (µmol/g)

An amount of sample weighing 1–5 g is added to 50 ml of 0.01N acetic acid in methy isobutyl ketone (MIBK) in an Erlenmyer flask. Then the flask is sealed with a rubber stopper and the content thereof is stirred with a magnetic stirrer for 2 hours and allow to stand overnight. A 10 ml aliquot of the supernatant (after subjecting to centrifugation, if necessary) is taken, diluted to about 60–70 ml with MIBK/methanol mixture, and then titrated with 0.01N potassium methoxide in MIBK/methanol mixture. Mb is calculated by the following equation.

Mb (µmol/g)=(Fb−Cb10)×500/P wherein Fb is the factor of 0.01N acetic acid solution in MIBK/methanol mixture, Ca is the consumed volume in ml of titrating solution, and P is the weight in gram of sample.

2. Ma (µmol/g)

An amount of sample weighing 1–5 g is added to 50 ml of 0.01N DMEA (N,N-dimethylaminoethanol) in MIBK in Erlenmyer flask. After stirring and standing as above, a 10 ml aliquot of the supernatant is taken, diluted to about 60–70 ml with MIBK, and then titrated with 0.01N HClO$_4$ in MIBK. Ma is calculated by the following equation:

Ma (µmol/g)=(Fa−Ca/10)×500/P wherein Fa is the factor of 0.01N DMEA solution in MIBK, Ca is the consumed volume in ml of titrating solution, and P is the weight in gram of sample.

The above titration is performed by the potentiometric titration using a glass electrode as indicator electrode and a silver-silver chloride electrode as reference electrode. Commercially available automatic titrators may be used in the above titration including HIRANUMA COMITITE-900 (Hiranuma Sangyo K.K.).

Examples of finely divided, water-insoluble, inorganic particles include titanium dioxide particles sold under the name of TIPAQUE CR-50, CR-90, CR-95, CR-97 and R-930 from Ishihara Sangyo Kaisha, Ltd.; TITONE R61-N from Sakai Chemical Industry Co., Ltd.; and TIPURE sold by DuPont; iron oxide particles sold under the name of MAPIKO YELLOW HY-100, LL-XLO, and TALOX synthetic iron oxide HY-250 from Titan Kogyo K.K., and BENGARA CM-25P from Nippon Bengara Kogyo K.K.; aluminum oxide particles sold under the name of Alminum Oxide C from Nippon Aerosil Kogyo K.K.; Zinc oxide particles sold under the name of AENKA #1 from Mitsui Mining & Smelting Co., ntd; and calcium carbonate particles sold under the name TANCAL A and TANCAL B sold from Maruo Calcium K.K. These particle are used as pigment and, therefore, inherently water-insoluble. Zirconium oxide particles may also be used.

Curable resin compositions

The equivalent ratio of component (a) and component (b) in the curable resin composition of the present invention generally lie between 2:1 and 1:2, preferably between 1.5:1 and 1:1.5 relative to the double bond and the active hydrogen atom to be added thereto. The proportion of component (c) may range generally between 0.1 and 10.0 equivalent %, preferably between 0.2 and 5.0 equivalent % based on the sum of component (a) and component (b). The proportion of component (d) may range generally between 1.0 and 200 weight %, preferably between 5.0 and 140 weight % based on the sum of component (a) and component (b).

When used as a coating composition, it may contain a variety of conventional additives such as solvents, extender pigments, coloring pigments, sag-preventing agents, UV absorbers and the like. After applying onto a substrate as a film, the composition may be cured by leaving at ambient temperature or by baking the film at a temperature between 100° C. and 270° C., preferably between 120° and 250° C.

The following examples are intended to illustrate the present invention without limiting thereto. All parts and per cents therein are by weight unless otherwise specified.

PRODUCTION EXAMPLES 1-2

To a 4-necked flask charged with 300 parts of xylene was added dropwise a monomer mixture containing a polymerization initiator shown in Table 1 at 110° C. over 3 hours. After the addition, the mixture was allowed to react at 110° C. for 30 minutes. Then 2.5 parts of KAYAESTER O (t-butylperoxyoctate sold by Nippon Kayaku Co., Ltd.) in 20 parts of xylene were added dropwise at 110° C. over 30 minutes and the mixture allowed to react at the same temperature for additional 90 minutes.

PRODUCTION EXAMPLE 3

To a 4-necked flask charged with 400 parts of xylene was added dropwise a monomer mixture containing a polymerization initiator shown in Table 1 at 110° C. over 3 hours. After the addition, the mixture was allowed to react at 100° C. for 30 minutes. Then 2.5 parts of KAYAESTER O (t-butylperoxyocatate sold by Nippon Kayaku Co., Ltd.) in 15 parts of xylene were added dropwise at 100° C. over 30 minutes and the mixture allowed to react at the same temperature for additional 90 minutes. An acrylic resin solution having 54.1% nonvolatiles, a number average molecular weight Mn measured by the GPC method of 10,900, and an active hydrogen equivalent weight of 374 was obtained.

PRODUCTION EXAMPLE 4

To a 4-necked flask charged with 360 parts of xylene was added dropwise a monomer mixture containing a polymerization initiator shown in Table 1 at 110° C. over 3 hours. After the addition, the mixture was allowed to react at 110° C. for 30 minutes. Then 2 parts of KAYAESTER O (t-butylperoxyoctate sold by Nippon Kayaku Co., Ltd.) in 40 parts of xylene were added dropwise at 110° C. over 30 minutes and the mixture allowed to react at the same temperature for additional 90 minutes. An acrylic resin solution having 50.8% nonvolatiles, a number average molecular weight Mn measured by the GPC method of 4,900, and an epoxy equivalent weight of 561 was obtained.

TABLE 1

| Material, parts | Production Example | | | |
|---|---|---|---|---|
| | 1 | 2 | 3 | 4 |
| 2-Acetoacetoxyethyl methacrylate | 143 | 191 | 143 | — |
| Methyl methacrylate | 186 | 171 | 186 | 73.75 |
| 2-Ethylhexyl acrylate | 121 | 88 | 121 | — |
| Ethyl acrylate | 50 | 50 | 50 | — |
| n-Butyl methacrylate | — | — | — | 300 |
| Glycidyl methacrylate | — | — | 101 | 126.25 |
| KAYAESTER O | 15 | 15 | 5 | 22 |
| Nonvolatiles, % | 60.4 | 60.4 | 54.1 | 50.8 |
| Mn | 5800 | 6000 | 10900 | 4900 |
| Ative hydrogen equivalent wt. (solids) | 374 | 281 | 374 | — |
| Epoxy equivalent wt. (solids) | — | — | — | 561 |

PRODUCTION EXAMPLE 5

To 394 part of the acrylic resin solution of Production Example 4 (200 parts as solids) were added 0.1 parts of hydroquinone, 1.0 part of tetrabutylammonium bromide and 30 parts of methacrylic acid. The mixture was allowed to react at 120° C. until an acid number of less than 1 was reached. A resin solution having a nonvolatile content of 53.0%, and an alkene equivalent weight of 630 was obtained.

PRODUCTION EXAMPLE 6

A reactor was charged with 136 parts of 1,6-hexanediol, 78 parts of dimethyl phthalate, 230 parts of dimethyl maleate and 1 part of dibutyltin oxide. The mixture was heated gradually to 200° C. while distilling off methanol formed by a transesterification reaction. Then the reaction was continued at 200° C. until no distillation of methanol was found. After cooling 250 parts of xylene were added. A resin solution having a nonvolatile content of 61.4%, Mn of 1,700, and an alkene equivalent weight as solids of 264 was obtained.

PRODUCTION EXAMPLE 7

A reactor was charged with 236 parts 1,6-hexanediol, 264 parts of dimethyl malonate and 1 part of dibutyltin oxide. The mixture was heated gradually to 200° C. while distilling off methanol formed by a transesterification reaction. Then the reaction was continued at 200° C. until no distillation of methanol was found. After cooling 250 parts of xylene were added. A resin solution having a nonvolatile content of 58.8%, Mn of 1,800 and an active hydrogen equivalent weight as solids of 91 was obtained.

Surface Basicity Measurement

Surface basicities of various pigment particles were determined potentionmetrically according to the method as described above. The results are as follows:

| Material | Surface basicity (μmol/g) |
|---|---|
| TIPAQUE CR-95[1] | 6 |
| TIPAQUE CR-97[1] | 27 |
| TIPAQUE R-960[2] | 7 |
| MAPIKO YELLOW HY-100[3] | 19 |
| BENGARA CM-25P[4] | 16 |
| Aluminium oxide C[5] | 157 |
| Mitsubishi Carbon MA-100[6] | −73 |
| Phthalocyanine Blue 5241[7] | −10 |

Remarks:
1) $TiO_2$ sold by Ishihara Sangyo Kaisha, Ltd.
2) $TiO_2$ sold by Dupont.
3) Iron oxide sold by Titan Kogyo K.K.
4) Iron oxide sold by Nippon Bengara Kogyo K.K.
5) sold by Nippon Aerosil Kogyo K.K.
6) Carbon black sold by Mitsubishi Chemical Corp.
7) sold by Dainichiseika Color & Chemicals Mfg. Co., Ltd.

EXAMPLE 1

831 parts of the resin solution of Production Example 1, 602 parts of TIPAQUE CR-97, 100 parts of pentaerythritol triacrylate (PETA) and 3 parts of tetrabutylammonium bromide (TBABr) were thoroughly mixtured. The mixture was milled in a paint shaker until a particle size of less than 30 μm was reached. The dispersion was applied on a tinplate using a #40 bar coater and heated in an oven at 220° C. for 2 minutes. The gel fraction of the resulting cured film was determined based on the difference of weight before and after soaking the film in a 1:1 mixture of acetone and methanol at room temperature for 48 hours. The result is shown in Table 2. The composition gelled upon storage at 40° C. for 3 days.

EXAMPLE 2

Example 1 was followed using the formulation shown in Table 2. The gel fraction of the film baked at 140° C. for 20 minutes is shown in Table 2. The composition gelled upon storage at 40° C.

EXAMPLE 3

Example 1 was followed using the formulation shown in Table 2. The gel fraction of the film cured at 20° C. for 8 hours is shown in Table 2.

EXAMPLE 4

Example 1 was followed using the formulation shown in Table 2. The gel fraction of the film baked at 140° C. for 20 minutes is shown in Table 2. The composition is stable upon storage at 40° C. for 10 days.

EXAMPLES 5-8

Example 1 was followed using the formulation shown in Table 2. The gel fraction of each film baked at 220° C. for 2 minutes is shown in Table 2. The compositions are stable upon storage at 40° C. for 10 days.

EXAMPLE 9

Example 1 was followed using the formulation shown in Table 2. The gel fraction of the film cured at 20° C. for 8 hours is shown in Table 2.

COMPARATIVE EXAMPLE 1

Example 1 was followed using the formulation shown in Table 2. The gel fraction of the film baked at 220° C. for 2 minutes is shown in Table 2.

COMPARATIVE EXAMPLE 2

Example 1 was followed using the formulation shown in Table 2. The gel fraction of the film baked at 140° C. for 20 minutes is shown in Table 2.

COMPARATIVE EXAMPLES 3 and 4

Example 1 was followed using the formulations shown in Table 2. The gel fraction of each film baked at 220° C. for 2 minutes is shown in Table 2.

TABLE 2

| | EXAMPLE | | | | | | |
|---|---|---|---|---|---|---|---|
| | 1 | 2 | 3 | 4 | 5 | 6 | 7 |
| Component(a), parts | PETA 100 | PETA 100 | PETA 100 | PETA 100 | PETA 100 | PETA 100 | PETA 100 |
| Component(b), parts | Pro.Ex.1 831 | Pro.Ex.2 935 | Pro.Ex.3 928 | Pro.Ex.2 227 | Pro.Ex.1 831 | Pro.Ex.1 831 | Pro.Ex.1 831 |
| Component(c), parts | TBABr 3 | TBABr 3 | TBABr 3 | TBACl 3 | TBABr 3 | TBABr 3 | TBABr 3 |
| Component(d), parts | TIPAQUE CR-97 602 | TIPAQUE CR-97 665 | TIPAQUE CR-97 602 | TIPAQUE CR-97 234 | TIPAQUE CR-97 602 | TIPAQUE CR-95 602 | MAPIKO YE. HY-100 301 |
| Curing condition | 220° C. × 2 min | 140° C. × 20 min | 20° C. × 8 hr. | 140° C. × 20 min | 220° C. × 2 min | 220° C. × 2 min | 220° C. × 2 min |
| Gel franction, % | 98.2 | 98.8 | 93.6 | 98.6 | 98.2 | 97.5 | 98.1 |

| | Example | | Comparative Example | | | |
|---|---|---|---|---|---|---|
| Formulation | 8 | 9 | 1 | 2 | 3 | 4 |
| Component(a), parts | PETA 100 | PETA 100 | PETA 100 | PETA 100 | PETA 100 | PETA 100 |
| Component(b), parts | Pro.Ex.1 831 | Pro.Ex.1 831 | Pro.Ex.1 831 | Pro.Ex.1 831 | Pro.Ex.1 831 | Pro.Ex.1 831 |
| Component(c), parts | TBABr 3 | TBABr 3 | TBABr 3 | TBABr 3 | TBABr 3 | Not present |
| Component(d), parts | BENGARA CM-25P 301 | $Al_2O_3$ C 157 | CARBON MA-100 50 | Phthal.Blue 5241 181 | Not present | TIPAQUE CR-97 602 |
| Curing condition | 220° C. × 2 min | 20° C. × 8 hr. | 220° C. × 2 min | 140° C. × 20 min | 220° C. × 2 min | 220° C. × 2 min |
| Gel franction, % | 97.8 | 97.6 | 25 | 20 | 0 | 35 |

EXAMPLES 10–14

Example 1 was followed except that 3 parts of TBABr were replaced by 1.5 parts of tetrabutylammonium chloride (TBACl), 2 parts of tetrabutylphosphonium bromide (TBPBr); 4 parts of tetrabutylammonium nitrate (TBANO), 4 parts of tetrabutylammonium di-t-butyl phosphate (TBAP), and 5 parts of tetrabutylaamonium methanesulfonate (TBAMS), respectively. The results are shown in Table 3.

COMPARATIVE EXAMPLE 5

Example 10 was followed except that TIPAQUE CR-97 was not added. The result is shown in Table 3.

COMPARATIVE EXAMPLE 6

Example 13 was followed except that TIPAQUE CR-97 was not added. The result is shown in Table 3.

TABLE 3

| | EXAMPLE | | | | | Comp. Example | |
|---|---|---|---|---|---|---|---|
| | 10 | 11 | 12 | 13 | 14 | 5 | 6 |
| Component(a), parts | PETA 100 | PETA 100 | PETA 100 | PETA 100 | PETA 100 | PETA 100 | PETA 100 |
| Component(b), parts | Pro.Ex.1 831 | PETA 100 | PETA 100 | PETA 100 | PETA 100 | PETA 100 | PETA 100 |
| Component(c), parts | TBACl 1.5 | TBPBr 2 | TBANO 4 | TBAP 4 | TBAMS 5 | TBACl 1.5 | TBAP 4 |
| Component(d), parts | TIPAQUE CR-97 602 | TBPBr 2 | TBANO 4 | TBAP 4 | TBAMS 5 | Not present | Not present |
| Curing condition | 220° C. × 2 min | TBPBr 2 | TBANO 4 | TBAP 4 | TBAMS 5 | Not present | Not present |
| Gel franction, % | 97.1 | 96.8 | 96.8 | 97.2 | 96.2 | 2.7 | 0 |

EXAMPLE 15

831 parts of the resin solution of Production Example 1, 100 parts of UA-306H (adduct of hexamethylenediisocyanate and pentaerythritol triacrylate at 1:2 moles sold by Kyoeisha Yushi Kagaku Kogyo K.K.), 602 parts of TIPAQUE CR-97 and 4 parts of TBABr were thoroughly mixed. The mixture was milled in a paint shaker until a particle size of less than 30 μm was reached. Using this dispersion, Example 1 was followed. The result is shown in Table 4. The composition gelled upon storage at 40° C. for 5 days.

EXAMPLE 16

332 parts of the resin solution of Production Example 1, 401 parts of NK ESTER A-400 (polyethylene glycol(n=9) diacrylate sold by Shin-Nakamura Kagaku Kogyo K.K.), 602 parts of TIPAQUE CR-97 and 4 parts of TBABr were thoroughly mixed. The mixture was milled in a paint shaker until a particle size of less than 30 μm was reached.

Using this dispersion, Example 1 was followed. The result is shown in Table 4. The composition was stable upon storage at 40° C. for 10 days.

EXAMPLE 17

986 parts of the resin solution of Production Example 5, 78.5 parts of ditrimethylolpropane tetraacetoacetate (DTMPTA), 602 parts of TIPAQUE CR-97 and 5 parts of TBABr were thoroughly mixed. The mixture was milled in a paint shaker until a particle size of less than 30 μm was reached.

Using this dispersion, Example 1 was followed. The result is shown in Table 4. The composition was stable upon storage at 40° C. for 10 days.

EXAMPLE 18

727 parts of the resin solultion of Production Example 6, 156 parts of DTMPTA, 7 parts of TBAC1 and 602 parts of TIPAQUE CR-97 were thoroughly mixed. The mixture was milled in a paint shaker until a particle size of less than 30 μm was reached. Using this dispersion, Example 1 was followed. The result is shown in Table 4. The composition was stable upon storage at 40° C. for 10 days.

COMPARATIVE EXAMPLE 7

Example 15 was followed except that TIPEK CR-97 was not added. The result is shown in Table 4.

COMPARATIVE EXAMPLE 8

Example 17 was followed except that TBABr was not added. The result is shown in Table 4.

TABLE 4

| | Example | | | | Comp. Example | |
|---|---|---|---|---|---|---|
| | 15 | 16 | 17 | 18 | 7 | 8 |
| Component(a), parts | UA-306H 100 | A-400 401 | Pro.Ex.5 986 | Pro.Ex.6 727 | UA-306H 100 | Pro.Ex.5 986 |
| Component(b), parts | Pro.Ex.1 831 | Pro.Ex.1 332 | DTMPTA 78.5 | DTMPTA 156 | Pro.Ex.1 831 | Pro.Ex.1 78.5 |
| Component(c), parts | TBABr 4 | TBAC1 3 | TBABr 5 | TBAC1 7 | TBABr 4 | Not present |
| Component(d), parts | TIPAQUE CR-97 602 | TBAC1 3 | TBABr 5 | TBAC1 7 | Not present | TIPAQUE CR-97 607 |
| Curing condition | 220° C. × 2 min | TBAC1 3 | TBABr 5 | TBAC1 7 | Not present | TIPAQUE CR-97 607 |
| Gel franction, % | 96.3 | 93.5 | 95.0 | 94.8 | 0 | 32.3 |

We claim:

1. A curable resin composition for coating use comprising:
   (a) a component containing a plurality of α, β-ethylenically unsaturated carbonyl groups in the molecule;
   (b) a component containing a plurality of an activated methylene group or an activated methylene group in the molecule;
   (c) a quaternary ammonium salt, a quaternary phosphonium salt or a tertiary sulfonium salt with a chloride, bromide, iodide, nitrate, a carboxylate, a sulfonate, sulfate, sulfite, an acid sulfate ester, phosphate or an acid phosphate ester anion;
   (d) a finely divided, water-insoluble, inorganic particles having a surface basicily of greater than 1.0 μmol/g.

2. The composition according to claim 1, wherein said component (a) is a polyol poly(meth)acrylate, an unsaturated polyester resin, a polyester acrylate resin, an epoxy acrylate resin, a urethane acrylate resin, a polyether acrylate resin, an α, β-unsaturated carbonyl group-containing acrylic resin, or a silicone oligomer having (meth)acryloyl groups.

3. The composition according to claim 1, wherein said component (b) is an ester of an activated methylene- or methynecarboxylic acid with a nonpolymeric or polymeric polyol, a reaction product of a polyamine with diketene, a polymer of an activated methylene group-containing acrylic monomer, or an adduct of an isocyanate compound with an activated methylene compound.

4. The composition according to claim 1, wherein the onium cation of said component (c) is a tetraalkylammonium, trialkylaralkylammonium, alkylpyridinium, tetraalkylphosphonium or trialkylsulfonium cation.

5. The composition according to claim 1, wherein said component (d) is finely divided particles of titanium dioxide, iron oxide, aluminum oxide, zinc oxide, zirconium oxide, calcium carbonate or a mixture thereof.

6. The compound according to claim 1, wherein component (a) is ethylene glycol di(meth)acrylate, diethylene glycol di(meth)acrylate, propylene glycol di(meth)acrylate, neopentyl glycol di(meth)acrylate, trimethylolpropane tri(meth)acrylate, glycerol tri(meth)acrylate, pentaerythritol tetra(meth)acrylate, unsaturated polyesters synthesized by the polycondensation reaction between maleic anhydride or fumaric acid optionally containing phthalic anhydride, iosphthalic, terephthalic, adipic, sebacic or trimellitic acid and ethylene glycol, diethylene glycol, propylene glycol tetramethylene glycol, 1,6-hexanediol, neopentyl glycol, trimethylolpropane, glycerine or pentaerythritol, epoxy acrylate resin produced by reacting (meth)acrylic acid with bisphenol or novolac epoxy resins, urethane acrylate resins produced by reacting a hydroxyl group-containing acrylic resin with isophoronediisocyanate, tolylenediisocyanate, diphenylmethanediisocyanate, hexamethylenediisocyanate or a urethane prepolymer thereof and with 2-hydroxyethyl (meth)acrylate, epoxy group-group containing acrylic resins produced by copolymerizing glycidyl (meth)acrylate with methyl, ethyl, propyl, n-butyl, isobutyl,t-butyl, 2-ethylhexyl or lauryl (meth)acrylate; 2-hydroxyethyl (meth)-acrylate, phenyl or benzyl (meth)acrylate, an adduct of 2-hydroxyethyl (meth)acrylate with polycaproplactone, acrylamide, methylene-bis-acrylamide, acrylonitrile, styrene, α-methylstyrene, iraconic acid, maleic acid, or vinyl acetate; an acryl polyol modified to have a plurality of α, β-unsaturated carbonyl functions by the acylation reaction with acrylic or methacrylic acid or a reactive derivative thereof, polyethylene glycol di(meth)acrylate or 3-methacryloyloxy-propyl-terminated polydiorganosiloxanes.

7. The compound according to claim 1, wherein component (b) is produced by reacting diketene with ethylenediamine, 1,3-diaminopropane, 1,4-diaminobutane, 1,6-hexanediamine, 1,12-diaminododecane, 1,2-diaminocyclohexane, phenylenediamine, piperazine, 2,6-diaminotoluene, diethyltoulenediamine, N,N'-bis(2aminopropyl)-ethylenediamine, or N,N'-bis(3-aminopropyl)-1,3-propanediamine; produced by copolymerizing 2-acetoacetoxyethyl (meth)acrylate, 2-cyanoacetoxyethyl (meth) acrylate, N-(2-cyanoacetoxyethyl)acrylamide, N-(2-propionylacetoxybutly) acrylamide, N-(4-acetoacetoxymethyl) benzylacrylamide, N-(2-acetoacetylaminoethyl) acrylamide or N-(2-acetoacetylaminoethyl)methacrylamide with an acrylic and/or nonacrylic monomer; or produced by transesterification between a trialkyl methanetricarboxylate and a nonpolymeric or polymeric polyol.

8. The compound according to claim 1, wherein component (c), the onium cation, is tetrabutylammonium, tetramethylammonium, tetraethylammonium, trimethylbenzylammonium, tetrapropylammonium, tetrahexylammonium, tetraoctylammonium, tetradecylammonium, tetrahexadecylammonium, triethylhexylammonium, 2-hydroxyethyltrimethylammonium, methyltrioctylammonium, cetyltrimethylammonium, 2-chloroethyltrimethylammonium or methylpyridinium.

9. The compound according to claim 1, wherein in component (c) the counter anion is a acetate, laurate, glycolate, benzoate, salicylate, maleate, phthalate, chloride, bromide, iodide, methanesulfonate, p-toluenesulfonate, dodecylbenzene sulfonate, triflate, nitrate, sulfate, methosulfate, phosphate or acid t-dibutylphosphate.

10. The compound according to claim 1, wherin the component (c), the counter ion, is tetrabutylphosphonium-bromide or a tertiary sulfonium salt.

* * * * *